US012802597B2

(12) United States Patent
Kim et al.

(10) Patent No.: US 12,802,597 B2
(45) Date of Patent: Nov. 17, 2026

(54) HOLOGRAM POSITION CONTROL APPARATUS AND METHOD

(71) Applicants: HYUNDAI MOTOR COMPANY, Seoul (KR); KIA CORPORATION, Seoul (KR); MARKETON INC, Seoul (KR)

(72) Inventors: Dong Gu Kim, Hwaseong-si (KR); Deok Woo Yun, Hwaseong-si (KR); Gwan Sik Kim, Hwaseong-si (KR); Seok Min Lee, Hwaseong-si (KR); Kyong Hwa Song, Hwaseong-si (KR); Jang Hyeon Lee, Hwaseong-si (KR); Chang Joon Yang, Seoul (KR)

(73) Assignees: HYUNDAI MOTOR COMPANY, Seoul (KR); KIA CORPORATION, Seoul (KR); MARKETON INC, Seoul (KR)

( * ) Notice: Subject to any disclaimer, the term of this patent is extended or adjusted under 35 U.S.C. 154(b) by 0 days.

(21) Appl. No.: 19/184,873

(22) Filed: Apr. 21, 2025

(65) Prior Publication Data

US 2026/0065819 A1 Mar. 5, 2026

(30) Foreign Application Priority Data

Aug. 27, 2024 (KR) ........................ 10-2024-0114801

(51) Int. Cl.
*G09G 3/00* (2006.01)
*G06F 3/01* (2006.01)

(52) U.S. Cl.
CPC ............. *G09G 3/003* (2013.01); *G06F 3/012* (2013.01); *G06F 3/013* (2013.01); *G09G 2340/0464* (2013.01); *G09G 2354/00* (2013.01); *G09G 2380/10* (2013.01)

(58) Field of Classification Search
CPC .......... G09G 3/008; G06F 3/012; G06F 3/013
USPC .......................................................... 345/156
See application file for complete search history.

(56) References Cited

U.S. PATENT DOCUMENTS

| | | | | |
|---|---|---|---|---|
| 7,257,920 B1 * | 8/2007 | Shaffer | F41G 1/30 42/118 |
| 11,666,825 B2 * | 6/2023 | Delamont | A63F 13/52 463/32 |
| 2010/0033782 A1 * | 2/2010 | Olaya | G03H 1/2294 359/9 |
| 2013/0120525 A1 * | 5/2013 | Yoon | G03H 1/2294 348/41 |
| 2020/0368616 A1 * | 11/2020 | Delamont | A63F 13/21 |

* cited by examiner

*Primary Examiner* — Calvin C Ma
(74) *Attorney, Agent, or Firm* — Lempia Summerfield Katz LLC

(57) ABSTRACT

A hologram position control apparatus and method are disclosed. The hologram position control apparatus includes a hologram module configured to project a hologram image in an air region, a position adjusting part configured to adjust a position of the hologram module, at least one processor, and at least one memory configured to store at least one program executable by the at least one processor. The processor is configured to calculate a correction angle for adjusting the position of the hologram module based on a direction of a sightline of a user. The position adjusting part is configured to adjust the position of the hologram module based on the calculated correction angle.

20 Claims, 7 Drawing Sheets

HOLOGRAM POSITION CONTROL APPARATUS AND METHOD

CROSS-REFERENCE TO RELATED APPLICATION

This application claims priority to and the benefit of Korean Patent Application No. 10-2024-0114801, filed in the Korean Intellectual Property Office on Aug. 27, 2024, the entire contents of which are hereby incorporated herein by reference.

BACKGROUND

1. Technical Field

The present disclosure relates to a hologram position control apparatus and method, and more specifically, to a hologram position control apparatus and method for adjusting a position of a hologram module that generates a hologram image based in a sightline of a user.

2. Discussion of Related Art

The use of a hologram display that displays a three-dimensional (3D) image generated by interference and diffraction of light in air such that a user recognizes the 3D image as an actual object is gradually increasing. As an example, studies for applying hologram displays to operating interfaces linked to entertainment systems in vehicles are actively being carried out.

However, in the existing hologram technology, since a hologram image is clearly seen at a specific angle under a specific condition, the visibility of a hologram is changed according to a position or a sightline of a user. Accordingly, the it is difficult for the user to experience a hologram image of which quality is the same at various positions of the user in a vehicle or various postures of the user, and the experience for an interface provided by the hologram image change.

In addition, since the user should manipulate the entertainment system through the hologram image without receiving physical feedback, the it is difficult for the user to accurately manipulate the entertainment system through the hologram image while the user drives the vehicle.

In addition, in the existing hologram image, when an angle formed between a sightline of a user and a hologram image is 90 degrees, the visibility is best regardless of a distance. Thus, there is a problem that only a specific user can use the hologram image.

SUMMARY

Embodiments of the present disclosure provide a hologram position control apparatus and method that automatically adjust horizontal and vertical angles of a hologram display module according to a position and a sightline of a user in a vehicle to provide optimum hologram visibility to the user at any position and facilitate manipulation through a hologram.

Technical objectives of the present disclosure are not limited to the above-described technical objectives. Other technical objectives that are not described herein should be more clearly understood by those having ordinary skill in the art to which the present disclosure pertains from the following description.

According to an aspect of the present disclosure, a hologram position control apparatus is provided. The hologram position control apparatus includes a hologram module that projects a hologram image in an air region, a position adjusting part that adjusts a position of the hologram module, at least one processor, and at least one memory that stores at least one program executable by the at least one processor. The processor calculates a correction angle for adjusting the position of the hologram module based on a direction of a sightline of a user. The position adjusting part adjusts the position of the hologram module based on the calculated correction angle.

The processor may calculate at least one of a horizontal correction angle for adjusting a horizontal angle of the hologram module or a vertical correction angle for adjusting a vertical angle of the hologram module based on the direction of the sightline. The position adjusting part may adjust at least one of the horizontal angle and the vertical angle of the hologram module based on the at least one of the calculated horizontal correction angle and the calculated vertical correction angle.

The adjusted horizontal angle may be the horizontal correction angle at which the hologram module rotates clockwise or counterclockwise with respect to a vertical center line of the hologram module when directly viewing a front surface of the hologram module, and the adjusted vertical angle may be the vertical correction angle at which the hologram module rotates clockwise or counterclockwise with respect to a horizontal center line of the hologram module when directly viewing the front surface of the hologram module.

The processor may calculate the horizontal correction angle based on a distance between the hologram module and an eye of the user.

The processor may calculate the horizontal correction angle using an equation below.

$$\theta_{h0} = \tan^{-1}\frac{d}{y}$$

Here, $\theta_{h0}$ is the horizontal correction angle, d is a minimum distance between a horizontal center line of the hologram module and the eye of the user, and y is a minimum distance between a vertical center line of the hologram module and the eye of the user.

The processor may calculate the vertical correction angle using an angle formed between a front surface of the hologram module and the hologram image, a position of an eye of the user, and an angle at which the eye of the user look at the hologram module.

The processor may calculate the vertical angle using equations below.

$$\theta_{v1} = \tan^{-1}\left(\frac{h}{x}\right)$$

$$\theta_{v2} = \theta_{v0} - \left(\frac{\pi}{2} - \theta_{v1}\right)$$

Here, $\theta_{v1}$ is an angel formed with respect to a horizontal line when the eye of the user sees the hologram module, x is a horizontal distance from a central point of the front surface to the eye of the user, h is a vertical distance from the central point of the front surface to the eyes of the user, $\theta_{v2}$ is the vertical correction angle, and $\theta_{v0}$ is an angle formed between the front surface and the hologram image.

The processor may control the hologram module to dynamically adjust content displayed on the hologram image according to the direction of the sightline of the user.

The hologram module may perform at least one of emphasizing the content, changing the content, and displaying additional information, which are displayed on the hologram image.

The hologram position control apparatus may further include at least one camera which captures an image of a face of the user and transmits the captured image, wherein the processor may analyze the captured image and detect the direction of the sightline of the user.

According to another aspect of the present disclosure, a hologram position control method is provided. The hologram position control method may be performed by a computing apparatus including at least one processor and a memory storing at least one program executable by the at least one processor. The hologram position control method includes determining a direction of a sightline of a user with respect to a hologram module, calculating a correction angle for adjusting a position of the hologram module based on the determined direction of the sightline, and adjusting the position of the hologram module based on the calculated correction angle.

In the calculating of the correction angle, at least one of a horizontal correction angle for adjusting a horizontal angle of the hologram module and a vertical correction angle for adjusting a vertical angle of the hologram module may be calculated based on the direction of the sightline, and in the adjusting of the position, at least one of the horizontal angle and the vertical angle of the hologram module may be adjusted based on the at least one of the calculated horizontal correction angle and the calculated vertical correction angle.

In the calculating of the correction angle, the horizontal correction angle may be calculated based on a distance between the hologram module and an eye of the user.

In the calculating of the correction angle, the horizontal correction angle may be calculated using an equation below.

$$\theta_{h0} = \tan^{-1}\frac{d}{y}$$

In the calculating of the correction angle, the vertical correction angle may be calculated using an angle formed between a front surface of the hologram module and a hologram image, a position of an eye of the user, and an angle at which the eye of the user sees the hologram module.

In the calculating of the correction angle, the vertical angle may be calculated using equations below.

$$\theta_{v1} = \tan^{-1}\left(\frac{h}{x}\right)$$

$$\theta_{v2} = \theta_{v0} - \left(\frac{\pi}{2} - \theta_{v1}\right)$$

The hologram position control method may further include controlling the hologram module to dynamically adjust content displayed on a hologram image according to the direction of the sightline of the user.

In the determining of the direction of the sightline of the user, the direction of the sightline of the user may be detected by analyzing a captured image including a face of the user.

BRIEF DESCRIPTION OF THE DRAWINGS

The above and other objects, features, and advantages of the present disclosure should become more apparent to those of ordinary skill in the art from the following detailed description with reference to the accompanying drawings, in which.

DETAILED DESCRIPTION

Figure 1:
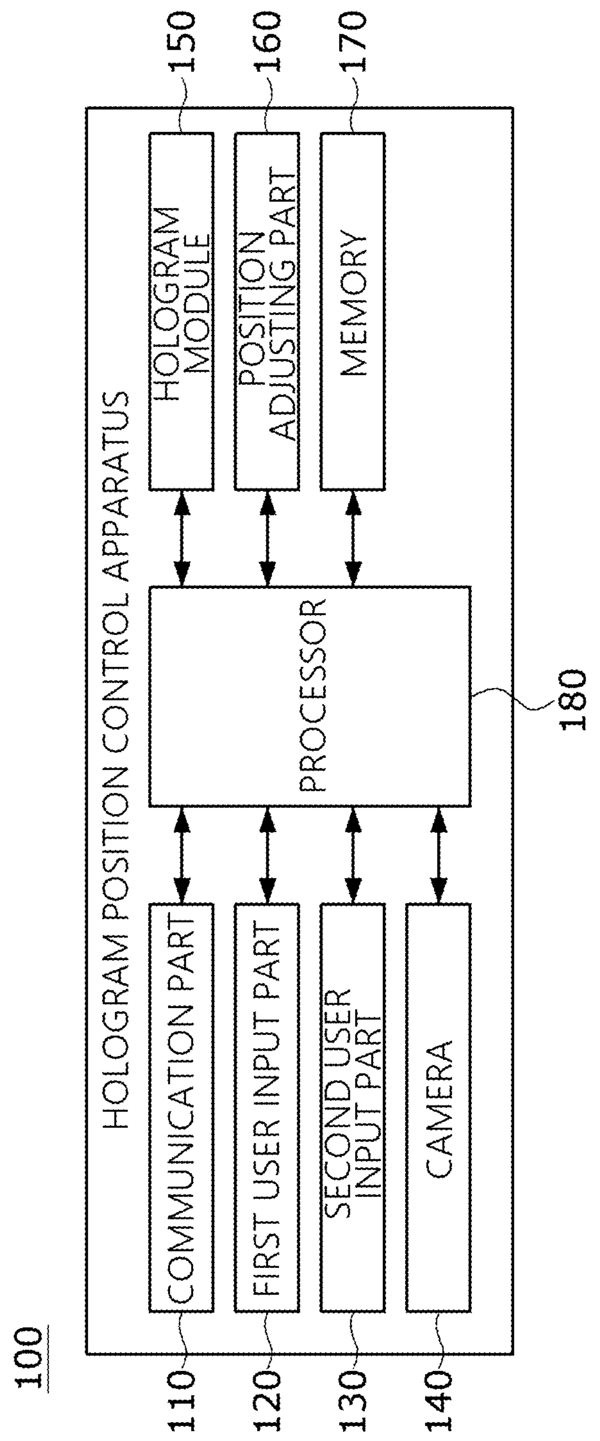
FIG. 1 is a block diagram illustrating a hologram position control apparatus, according to an embodiment of the present disclosure.

Hereinafter, various embodiments of the present disclosure are described in detail with reference to the accompanying drawings to enable those having ordinary skill in the art to make and utilize embodiments of the present disclosure. However, the present disclosure may be implemented in several different forms and is not limited to the embodiments described herein.

In the description below, specific descriptions of the known components or functions have been omitted when it was deemed that the descriptions may obscure the gist of the present disclosure. In addition, parts irrelevant to the description of the present disclosure have been omitted from the drawings, and the same or similar parts are denoted by similar reference numerals.

In the present disclosure, a case, in which a first component is “connected,” “coupled,” or “bonded” to a second component, may include not only a direct connecting case but also an indirect connecting case in which a third component is present therebetween. In addition, when it is described that a first component “includes” or “comprises” a second component, other components are not excluded unless specifically described otherwise, and other components may further be included therein.

In the present disclosure, the terms such as “first,” “second,” and the like are used only to distinguish one component from another component, and orders, importance, or the like between the components are not limited by these terms unless specifically described herein. Accordingly, in the present disclosure, a first component in one embodiment may be referred to as a second component in another embodiment, and similarly, a second component in one embodiment may be referred to as a first component in another embodiment.

In the present disclosure, different components are for clearly describing features thereof, and it does not mean that the components are necessarily separated from each other. For example, a plurality of components may be integrated into one hardware unit or software unit, and one component may be divided into a plurality of hardware units or software units. Accordingly, even when not described additionally, the integrated or divided embodiments also fall within the scope of the present disclosure.

In the present disclosure, components that are described in various embodiments do not necessarily mean essential components. Some components may be optional components. Accordingly, embodiments including a subset of the components described in one embodiment fall within the scope of the present disclosure. In addition, embodiments including components added to components described in various embodiments also fall within the scope of the present disclosure.

In the present disclosure, the terms, "A or B," "at least one of A and B," "at least one of A or B," "A, B, or C," "at least one of A, B, and C," and "at least one of A, B, C or combination thereof may each include any one or all possible combinations among items listed with the corresponding terms.

Advantages and features of the present disclosure and methods of achieving the same should be more clearly understood by those having ordinary skill in the art with reference to the accompanying drawings and the following detailed description. However, the present disclosure is not limited to the described embodiments. Rather, the present disclosure may be implemented in various different forms, and the described embodiments are provided to make the present disclosure complete and to fully convey the scope of the present disclosure to those having ordinary skill in the art.

In addition, the terms, such as "module," "part," "apparatus," and "server" in the present disclosure are intended to denote functional and structural coupling of hardware and software that is driven by the corresponding hardware or drives the hardware. For example, the hardware herein may be a data processing apparatus including a central processing unit (CPU) or another processor. In addition, the software driven by the hardware may be an executing processor, an object, an executable file, a thread of execution, a program, or the like.

The term "unit," "part," or "module" used in this specification signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof When a component, device, unit, element, or the like of the present disclosure is described as having a purpose or performing an operation, function, or the like, the component, device, or element should be considered herein as being "configured to" meet that purpose or perform that operation or function Herein, specific technical content to be implemented by the present disclosure are described in detail with reference to the accompanying drawings.

Figure 2:
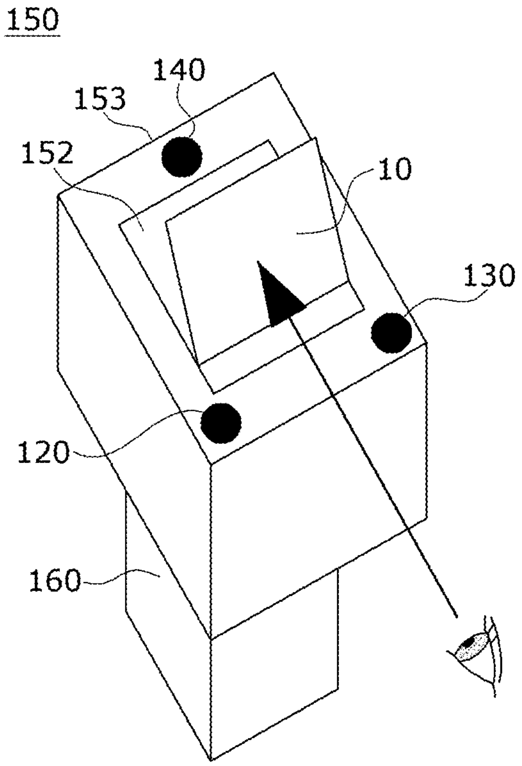
FIG. 2 is a perspective view of the hologram position control apparatus, according to an embodiment of the present disclosure.
Figure 3:
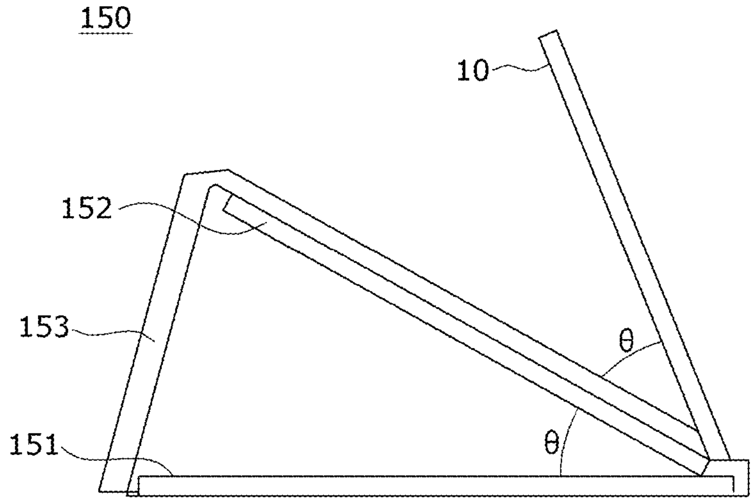
FIG. 3 is a partial side view of the hologram position control apparatus, according to an embodiment of the present disclosure.

FIG. 1 is a block diagram illustrating a hologram position control apparatus 100, according to an embodiment of the present disclosure. FIG. 2 is a perspective view of the hologram position control apparatus 100, according to an embodiment of the present disclosure. FIG. 3 is a partial side view of the hologram position control apparatus 100, according to an embodiment of the present disclosure.

Referring to FIGS. 1-3, the hologram position control apparatus 100 according to an embodiment of the present disclosure may be a computing apparatus or electronic apparatus including a communication part 110, a first user input part 120, a second user input part 130, a camera 140, a hologram module 150, a position adjusting part 160, a memory 170, and a processor 180.

The communication part 110 may communicate with vehicle controllers that perform a plurality of operations provided by a vehicle. As an example, the communication part 110 may transmit a user command input through the hologram module 150 in a non-contacting manner to the vehicle controller related to the user command and may transmit data received from the vehicle controller to the processor 180.

According to one embodiment, the vehicle including the hologram module 150 may include at least one vehicle controller. The vehicle controller may be provided as an embedded system type in the vehicle. When the vehicle controller is provided as a plurality of vehicle controllers, the plurality of vehicle controllers may be functionally implemented as independent apparatuses or communicatively connected to each other. In addition, at least one vehicle controller may be integrally implemented with control units (for example, processors (not shown)) in the vehicle or implemented as an independent separate chip. As an example, at least one controller may be implemented as one of various types such as an electronic control unit (ECU), a micro controller unit (MCU), a central processing unit (CPU), and a microprocessor.

A function controllable by at least one vehicle controller may be one of various vehicle control functions including engine control, transmission control, electronic stability control, airbag control, tire pressure monitoring, motor control, seat control, door control, or the like.

The first and second user input parts 120 and 130 may provide interfacing passages between an occupant of the vehicle and the hologram position control apparatus 100. When one of the first and second user input parts 120 and 130 is selected by the occupant, the selected user input part may transmit a hologram display request signal for requesting a hologram image to be displayed and identification information of the selected user input part to the processor 180.

As an example, the first user input part 120 may be provide on a lower end of the hologram module 150, and the second user input part 130 may be provided on a central console box of a back seat. In this case, when the first user input part 120 is selected, the processor 180 may determine that a driver or an occupant of a passenger seat requests hologram display, and when the second user input part 130 is selected, the processor 180 may determine that the occupant on the back seat requests hologram display.

Alternatively, as illustrated in FIG. 2, the first user input part 120 and the second user input part 130 may be provided to be parallel on a front lower end of the hologram module 150 or a door of a driver seat and a door of a passenger seat. In this case, when the first user input part 120 is selected, the processor 180 may determine that the driver requests hologram display, and when the second user input part 130 is selected, the processor 180 may determine that the occupant on the passenger seat requests hologram display.

In addition, although not illustrated in the drawings, third and fourth user input parts (not shown) for the occupant on the back seat may be further provided. The third and fourth user input parts (not shown) may be provided on the central console box of the back seat or left and right doors of the back seat, or provided under the first and second user input parts 120 and 130 on the front surface of the hologram module 150.

In addition, when one user input part (not shown) is provided, the user of the vehicle may set a default occupant (as an example, driver) using an application or an operation panel of the vehicle which operates in conjunction with the hologram module 150. In this case, when the user input part (not shown) is selected, the processor 180 may trace and detect a direction of a sightline by recognizing a face of the driver in a captured image.

At least one camera 140 may be provided on the front surface of the hologram module 150 to capture an image of at least one occupant on the vehicle. The camera 140 may have a viewing angle for capturing images of faces of occupants on the front seat and the back seat. The camera 140 may capture the image of the faces of the occupants and transmit the captured images to the processor 180.

The camera 140 may be provided on an upper end, a middle end, or a lower end of the front surface of the hologram module 150. In FIG. 2, the camera 140 is illustrated as being provided on the upper end for illustrative purposes. The front surface of the hologram module 150 is a surface on which a plate 152 is provided and may be a surface facing the occupant.

Alternatively, the camera 140 may be a sightline tracing camera that may analyze a captured image including a face of an occupant, trace a sightline of the occupant, and detect a direction of the sightline of the occupant. When the camera 140 is the sightline tracing camera, the camera 140 may transmit the detected direction of the sightline to the processor 180. In the present disclosure, an example in which the camera 140 transmits the captured image to the processor 180, according to an embodiment, is described.

The hologram module 150 projects the hologram image 10 into the air using interference and diffraction of light rather than directly displaying the hologram image 10 on a physical surface. Accordingly, the hologram image 10 is displayed in air as a virtual image type. The hologram image 10 may be a still image or moving image.

The hologram module 150 may include a light source 151, the plate 152, and a housing 153.

The light source 151 may output light corresponding to the hologram image 10. The light source 151 may be, as an example, a liquid crystal display (LCD) panel.

The plate 152 may reflect or transmit the light emitted from the light source 151 to project the hologram image 10 in air.

The housing 153 may be a case entirely or partially surrounding the light source 151 and the plate 152. The light source 151 may be provided in the housing 153. The plate 152 may be provided on an upper portion of the housing 153. The surface on which the plate 152 is provided may be defined as the front surface of the hologram module 150. An inner portion of the housing 153 in which the light source 151 remains dark. In addition, an angle θ formed between the plate 152 and a virtual surface on which the hologram image 10 is displayed may be the same as an angle θ formed between the plate 152 and the light source 151.

Figure 4:
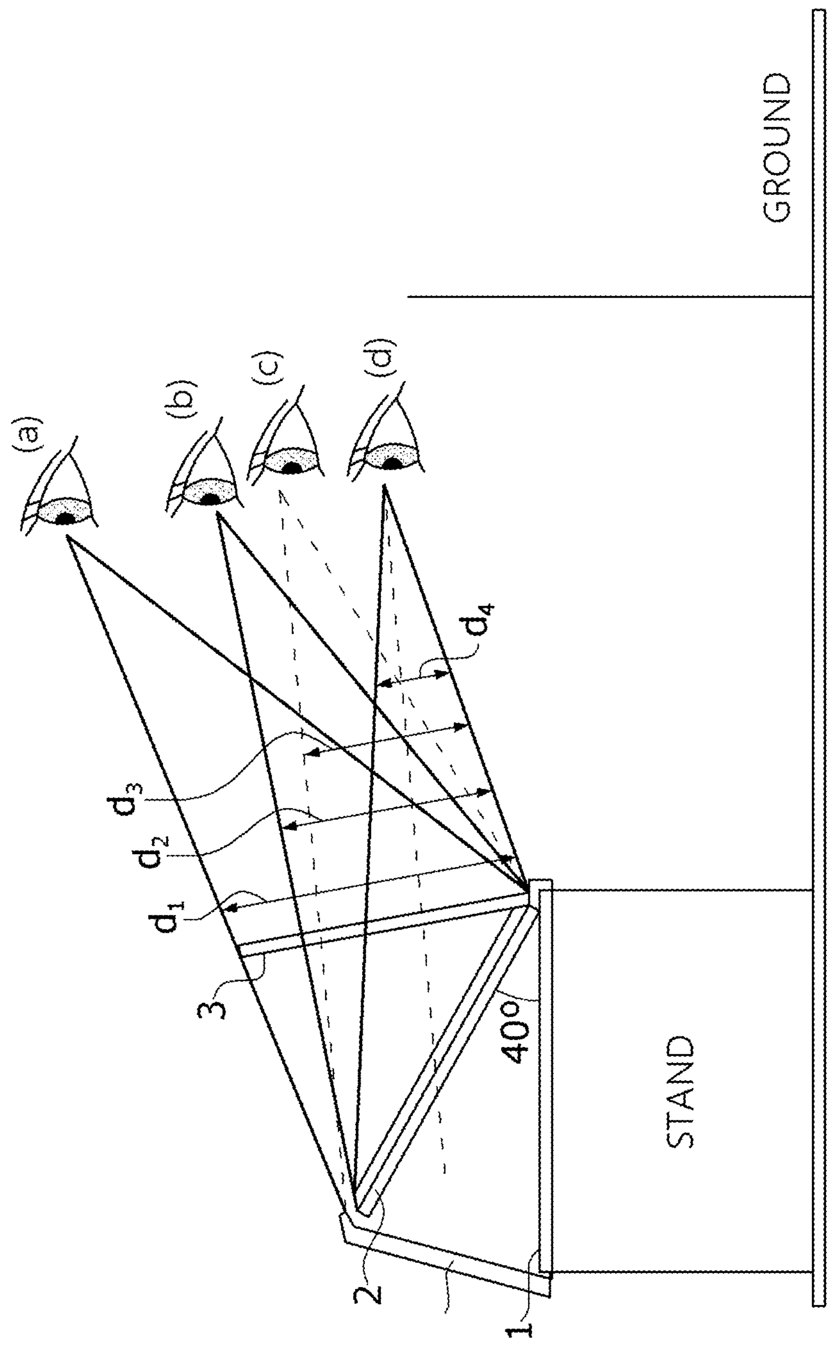
FIG. 4 is a view for describing the visibility of a hologram image according to a sightline, according to an embodiment of the present disclosure.

FIG. 4 is a view for describing the visibility of a hologram image 3 according to a sightline, according to an embodiment of the present disclosure.

Referring to FIG. 4, light emitted from the light source 1 passes through the plate 2 and is displayed as a hologram image in air. The visibility of the hologram image 3 is most superior when an angle formed between a sightline of the user and the hologram image 10 is 90 degrees regardless of a distance therebetween. Generally, the visibility is good in a range of +20 to −20 degrees with respect to a reference angle of 90 degrees. Accordingly, since the visibility is changed according to a physical condition (as an example, height) of the user or position of a seat, i.e., a direction of a sightline of the user, the good visibility is provided to a specific user.

In addition, as illustrated in FIG. 4, an entire hologram image may be seen with a size of d1 at a point of a sightline (a), an entire hologram image 3 may be seen with a size of d2 at a point of a sightline (b), the entire hologram image 3 may be seen with a size of d3 at a point of a sightline (c), and the entire hologram image 3 may be seen with a size of d4 at a point of a sightline (d). In this case an order of the sizes of the hologram images 3 is d1>d2>d3>d4.

As described above, since the hologram image formed by the hologram module 150 is seen at only a sight point of the user at a point at which light lines intersect in a specific manner without being directly formed on a surface of a medium, a size or visibility of the hologram image is changed according to a direction of a sightline of an occupant.

In the embodiment of the present disclosure, a hologram image with superior visibility like as from the point of the sightline (c) may be continuously provided by automatically adjusting a position, i.e., an angle, of the hologram module 150 based on a direction of a sightline of the user.

Referring to FIG. 1 again, the position adjusting part 160 may adjust a position of the hologram module 150 based on a correction angle calculated by the processor 180.

The memory 170 may store at least one of programs (as an example, a plurality of programs such as an operating system, software, firmware, middleware, and an application), various data, and at least one command for controlling the hologram position control apparatus 100 such that the program may be loaded, the data may be read or written, and an operation corresponding to the command may be performed by a request of the processor 180. The memory 170 may include a volatile memory and a non-volatile memory.

The processor 180 may generally control the hologram position control apparatus 100 according to an input command. The command may be input to the processor 180 by the memory 170 or the communication part 110. As an example, the processor 180 may control an operation of another (e.g., hardware or software) component connected to the hologram position control apparatus 100 and perform data processing and operation by executing the program or command stored in the memory 170. The processor 180 may include, as an example, at least one of at least one CPU, at least one microprocessor, and at least one digital signal processor (DSP). In addition, the processor 180 may load a command or data received from another component on the volatile memory, may process the command or data stored in the volatile memory, and may store a process result in the non-volatile memory.

As an example, the processor 180 may analyze a captured image transmitted from the camera 140 and trace or detect a direction of a sightline of the occupant from an analyzed result by executing a sightline tracing program stored in the memory 170. The processor 180 may detect the direction of the sightline of the occupant based on at least one of a face, an eye state, a head position, or a body position of the occupant from a facial image extracted from the captured image. For example, the processor 180 may trace and detect the direction of the sightline of the occupant by recognizing the face of the occupant, recognizing the eye state (the movement of pupils, whether eyelids are closed, and the like), recognizing a head position (including a direction) of the occupant, or recognizing a position of a body, or based on two or more recognitions thereof.

Hereinafter, an example in which the first user input part 120 is provided on the lower end of the hologram module 150 and the second user input part 130 is provided on the central console box of the back seat, according to an embodiment, is described.

When a hologram display request signal is input to the processor 180, the processor 180 checks the user input part (for example, first user input part 120), that outputs the hologram display request signal, and extracts an image of a face of an occupant (for example, driver on the driver's seat) set as a default occupant in a captured image. When there is no facial image of the driver, the processor 180 extracts a facial image of the occupant on the passenger seat.

Alternatively, when occupants are present on both the driver's seat and the passenger seat, the processor 180 may detect a direction of a sightline of the occupant who looks at the hologram module 150 from a captured image. When two occupants look at the hologram module 150, the processor 180 may detect a direction of a sightline of the occupant (for example, driver) set with higher priority, which is one example, and the present disclosure is not limited thereto.

Alternatively, when the second user input part 130 provided on the central console box of the back seat is selected and a hologram display request signal is input, the processor 180 determines that an occupant on a left back seat set with higher priority requests to display a hologram image. The processor 180 may extract a facial image of the occupant on the left back seat from a captured image and detect a direction of a sightline of the occupant from the extracted facial image. In addition, the processor 180 may calculate a correction angle for adjusting a position of the hologram module 150 based on the direction of the sightline. For example, the processor 180 may calculate the correction angle that allows an angle formed between the direction of the sightline of the occupant (for example, driver) and the hologram module 150 to be a preset angle (as an example, 90 degrees±20 degrees).

The processor 180 may calculate at least one of a horizontal correction angle for adjusting a horizontal angle or a vertical correction angle for adjusting a vertical angle of the hologram module 150 based on the direction of the sightline of the occupant.

The position adjusting part 160 may adjust at least one of the horizontal angle or the vertical angle of the hologram module 150 based on at least one the calculated horizontal correction angle or vertical correction angle. For example, the position adjusting part 160 may adjust the horizontal angle by rotating the hologram module 150 according to the horizontal correction angle and a vertical angle by rotating the hologram module 150 according to the vertical correction angle. In an example, the position adjusting part 160 may adjust a horizontal angle or vertical angle of the hologram module in a direction in which the hologram image 10 is most clear view when an occupant sees the hologram module 150.

In this case, the adjusted horizontal angle is a horizontal correction angle at which the hologram module 150 rotates clockwise or counterclockwise with reference to a vertical center line of the hologram module 150 when the occupant sees the front surface of the hologram module 150 from the front (i.e., sees the plan view).

In addition, the adjusted vertical angle is a vertical correction angle at which the hologram module 150 rotates clockwise or counterclockwise with reference to a horizontal center line of the hologram module 150 when the occupant sees the front surface of the hologram module 150 from the front.

The position adjusting part 160 may adjust at least one of the horizontal angle and the vertical angle of the hologram module 150 using an actuator in a continuous manner or step-by-step manner (e.g., according to a preset angle or an angle changeable according to an implementation method). The actuator is a mechanical apparatus used to move or control a certain apparatus and commonly called a prime driving apparatus using electricity, hydraulic pressure, compressed air, or the like. As an example, the actuator used in the position adjusting part 160 may be implemented as a motor using electricity. However, the actuator is not limited thereto, and may be implemented as an actuator with another type.

Figure 5:
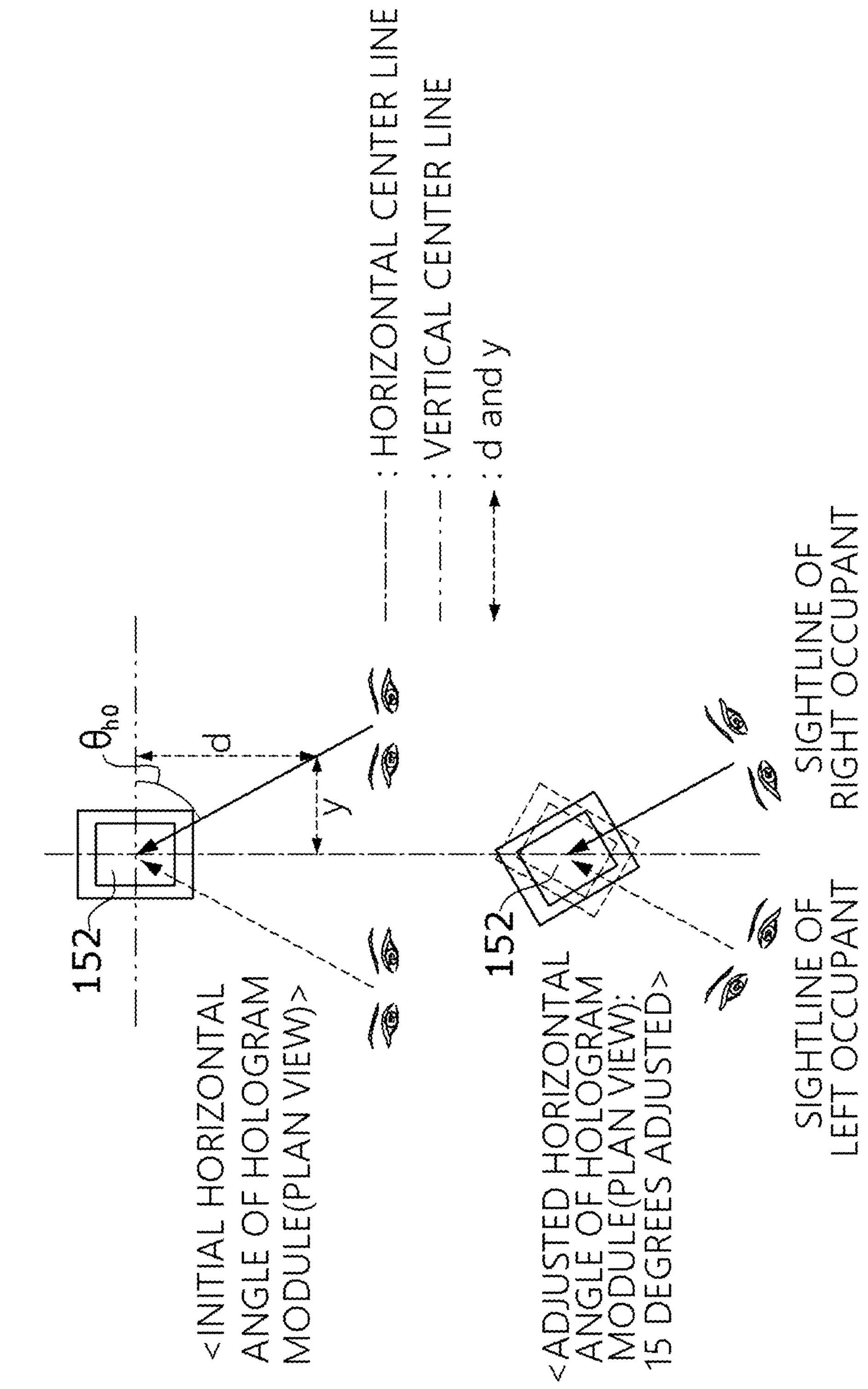
FIG. 5 is a view for describing an operation of calculating a horizontal correction angle, according to an embodiment of the present disclosure.

FIG. 5 is a view for describing an operation of calculating a horizontal correction angle, according to an embodiment of the present disclosure.

Referring to FIG. 5, a dashed one-dotted line is a vertical line, i.e., a vertical center line, extending from a central point of the front surface of the hologram module 150 or a central point of the plate 152 in a direction perpendicular to the ground, and a dashed two-dotted line is a horizontal line, i.e., a horizontal center line, extending from the central point of the front surface of the hologram module 150 or the central point of the plate 152 in a direction parallel to the ground.

In addition, a dotted line denotes an angle with respect to a direction of a sightline of a left occupant (as an example, driver), i.e., a position of eyes of the occupant, and a solid line denotes a direction of a sightline of a right occupant (as an example, occupant on the passenger seat).

The processor 180 may calculate a horizontal correction angle based on a distance between the hologram module 150 and eyes of an occupant. Equation 1 is an equation for calculating the horizontal correction angle.

$$\theta_{h0} = \tan^{-1}\frac{d}{y} \quad \text{[Equation 1]}$$

In Equation 1, $\theta_{h0}$ is a horizontal correction angle of the hologram module 150, d is a minimum distance between the horizontal center line of the hologram module 150 and eyes of a user, i.e., a vertical distance, y is a minimum distance between the vertical center line of the hologram module 150 and the eyes of the user. d and y may be calculated while the processor 180 analyzes a facial image of the occupant extracted from a captured image.

When the horizontal correction angle calculated using Equation 1 is greater than a preset horizontal critical value, the processor 180 may set the horizontal correction angle as a horizontal critical value. The horizontal critical value may be, for example, ±60° with respect to 0°. 0° is an initially set value of a horizontal angle of the hologram module 150 and may be an initial horizontal angle of the hologram module 150 when the occupant faces forward.

Since the plate 152 is manufactured by a manufacture according to a manufacturing specification, the initial horizontal angle may be set to ±25 degrees with respect to a center of the plate 152. Accordingly, convenience of using a hologram image may be improved using an automatic sightline tracing function for the occupant to always secure an optimum viewing angle.

In FIG. 5, in an initial state of the hologram module 150, a horizontal angle of the hologram module 150 is 0° when an occupant on a left seat or an occupant on a right seat faces forward. Then, when the horizontal angle is corrected using the calculated horizontal correction angle, a horizontal correction angle of the hologram module 150 is 15° when the occupant on the left seat or the occupant on the right seat faces forward.

Figure 6:
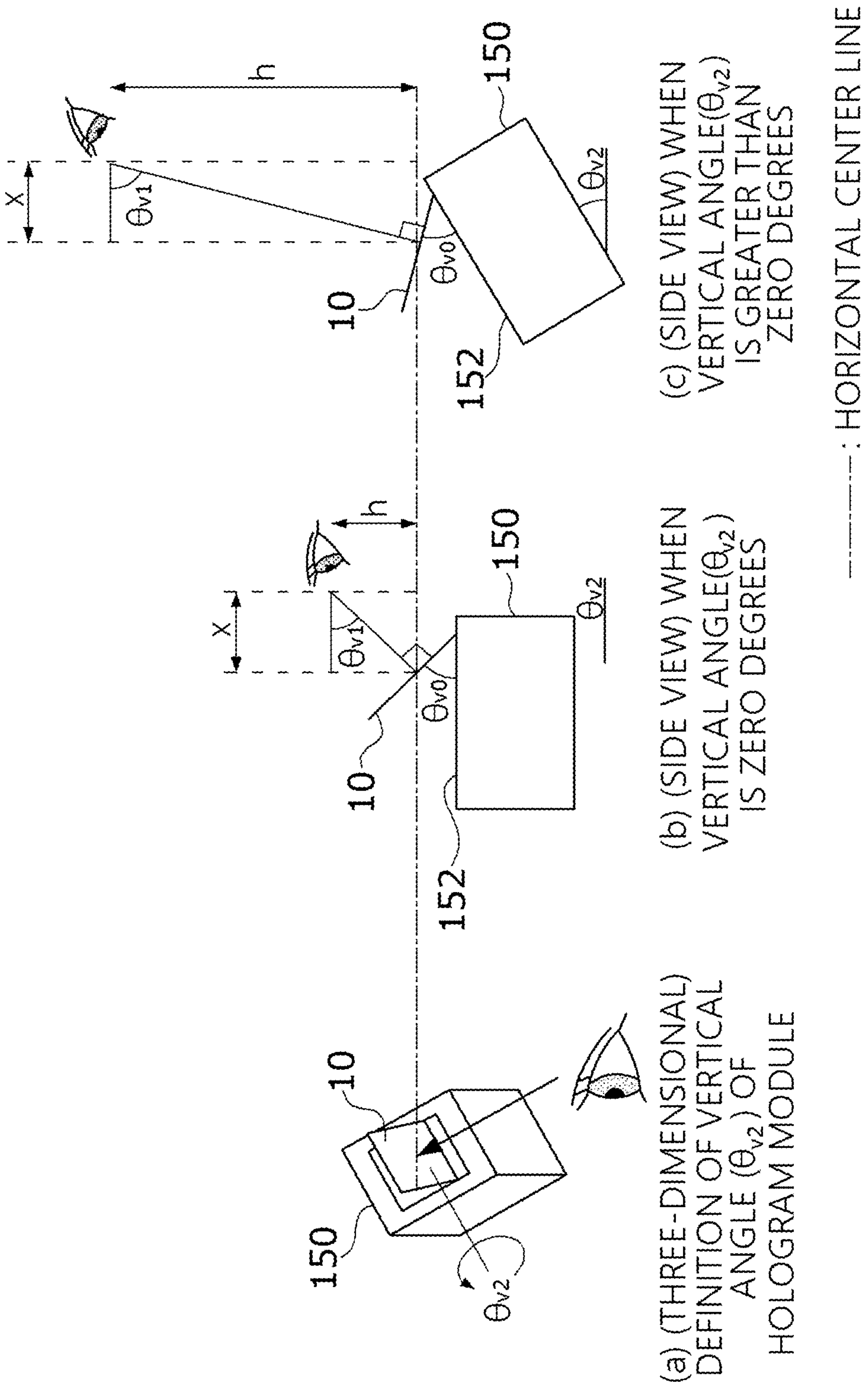
FIG. 6 is a view for describing an operation of calculating a vertical correction angle, according to an embodiment of the present disclosure.

FIG. 6 is a view for describing an operation of calculating a vertical correction angle, according to an embodiment of the present disclosure.

Referring to FIG. 6, a dashed one-dotted line is a horizontal line, i.e., a horizontal center line, extending from the central point of the front surface of the hologram module 150 or the central point of the plate 152 in a direction parallel to the ground. The (a) of FIG. 6 is a view for defining a vertical angle $\theta_{v2}$ of the hologram module 150 at a position and an angle of the eye of a random occupant when the occupant sits in, for example, the left or right back seat. The (b) and (c) of FIG. 6 are views showing a position (x and h) of the eye of the occupant and a vertical angle $\theta_{v2}$ of the hologram module 150 which is adjusted according to an angle $\theta_{v1}$ at which the eyes look at the hologram module 150 when the occupant sits in the back seat.

The processor 180 may calculate the vertical correction angle $\theta_{v2}$ using an angle $\theta_{v0}$ formed between the front surface of the hologram module 150 and the hologram image 10, the position of the eyes of the occupant, the angle $\theta_{v1}$ at which the eyes of the occupant look at the hologram module 150, and the position (x and h) of the eyes of the occupant. The processor 180 may calculate a vertical correction angle using Equation 2.

$$\theta_{v1} = \tan^{-1}\left(\frac{h}{x}\right) \quad \text{[Equation 2]}$$

$$\theta_{v2} = \theta_{v0} - \left(\frac{\pi}{2} - \theta_{v1}\right)$$

In Equation 2, $\theta_{v1}$ is an angle with respect to the horizontal center line when the eyes of the occupant look at the hologram module 150, x is a horizontal distance from the central point of the front surface of the hologram module 150 to the eyes of the occupant, h is a vertical distance (that is a height) from the central point of the front surface to the eyes of the occupant, $\theta_{v2}$ is a vertical correction angle, $\theta_{v0}$ is an angle formed between the front surface and the hologram image 10. The processor 180 may calculate x and h by analyzing a facial image.

As an example, when a height of an occupant 137.8 cm and his 11.8 cm, an adjusted vertical angle of the hologram module 150 may be 0°, and when a height of an occupant is 190 cm and h is 64 cm, an adjusted vertical angle of the hologram module 150 may be 34.6°. In this case, $\theta_{v0}$ is 45°, and x is 11.8 cm.

In addition, when a vertical correction angle calculated using Equation 2 is greater than a preset vertical critical value, the processor 180 may set the vertical correction angle as a vertical critical value. The vertical critical value may be, for example, ±25° with respect to 0°. 0° is an initial set value of a vertical angle of the hologram module 150 and may be a vertical angle of the hologram module 150 when the occupant faces forward.

When correction angles are calculated using Equations 1 and 2, the processor 180 may control the position adjusting part 160 to adjust a position of the hologram module 150 based on the calculated correction angle. When the position of the hologram module 150 is corrected such that the hologram image 10 faces the occupant, the processor 180 may display the hologram image 10 in air and allow the occupant on the left back seat to request functions such as adjusting an angle and a height of the seat and operating an air conditioner provided by the vehicle in a non-contacting manner. In this case, the processor 180 may correct the position of the hologram module 150 while displaying the hologram image 10.

As described above, a customized hologram image considering a direction of a sightline of an occupant may be provided, and as a result, the visibility of the hologram image 10 may be improved by correcting a position, i.e., at least one of a horizontal angle and a vertical angle of the hologram module 150.

Since the horizontal angle or vertical angle of the hologram module 150 is adjusted, the hologram module 150 may display a hologram image according to the adjusted horizontal angle or vertical angle. When the occupant touches an entire or partial region of the hologram image (with one or more fingers), the processor 180 may allow a process apparatus (as an example, ECU) related to the touched region to perform operations related to the corresponding touch. There are many operations related to the corresponding touch such as seat movement, temperature control in a vehicle, window opening and closing adjustment, and entertainment system control.

In addition, after the hologram image is displayed in air, the processor 180 may change content of the hologram image based on a direction of the following sightline of the occupant. For example, when a direction of a sightline (which is referred to as the direction of the following sightline of the occupant) toward the initially formed hologram image is detected, the processor 180 may calculate at least one of the horizontal angle and the vertical angle for adjusting a position of the hologram module 150 based on the direction of the following sightline.

In addition, when the occupant sees a specific region of the hologram image for a time greater than a set time when the direction of the following sightline is analyzed, the processor 180 may determine that the specific region corresponding to the direction of the following sightline receives attention and may dynamically adjust the corresponding specific region.

As an example, the processor 180 may control the hologram module 150 to perform at least one of emphasizing and changing content displayed in a specific region and displaying additional information. The hologram module 150 may perform dynamic control by emphasizing or changing a color displayed in the specific region, enlarging or reducing a size thereof, separately displaying additional information, or changing the displayed content according to the following sightline.

The processor 180 may adjust a horizontal angle or vertical angle of the hologram module 150 according to an individually set customized angle based on physical characteristics information of a plurality of occupants stored in the memory 170. The physical characteristics information of the occupant includes a plurality of pieces of information such as a height, a reference facial image, whether glasses are worn, vision information. The physical characteristics information of the occupant may be prestored in the memory 170. The reference racial image is an image used as a reference for recognizing the occupant.

When an occupant sits in the driver's seat or passenger seat in the front of the vehicle or the left or right back seat, the processor 180 may check a facial image of the occupant, who selects the user input part, from a captured image and physical characteristics information having a reference facial image most similar to the checked facial image in the memory 170. The processor 180 may control the position adjusting part 160 to adjust a position of the hologram module 150 based on a horizontal correction angle or vertical correction angle matched and stored in the checked physical characteristics information. In this case, the horizontal correction angle or the vertical correction angle may be automatically calculated by the processor 180 when the physical characteristics information of the occupant is input.

Figure 7:
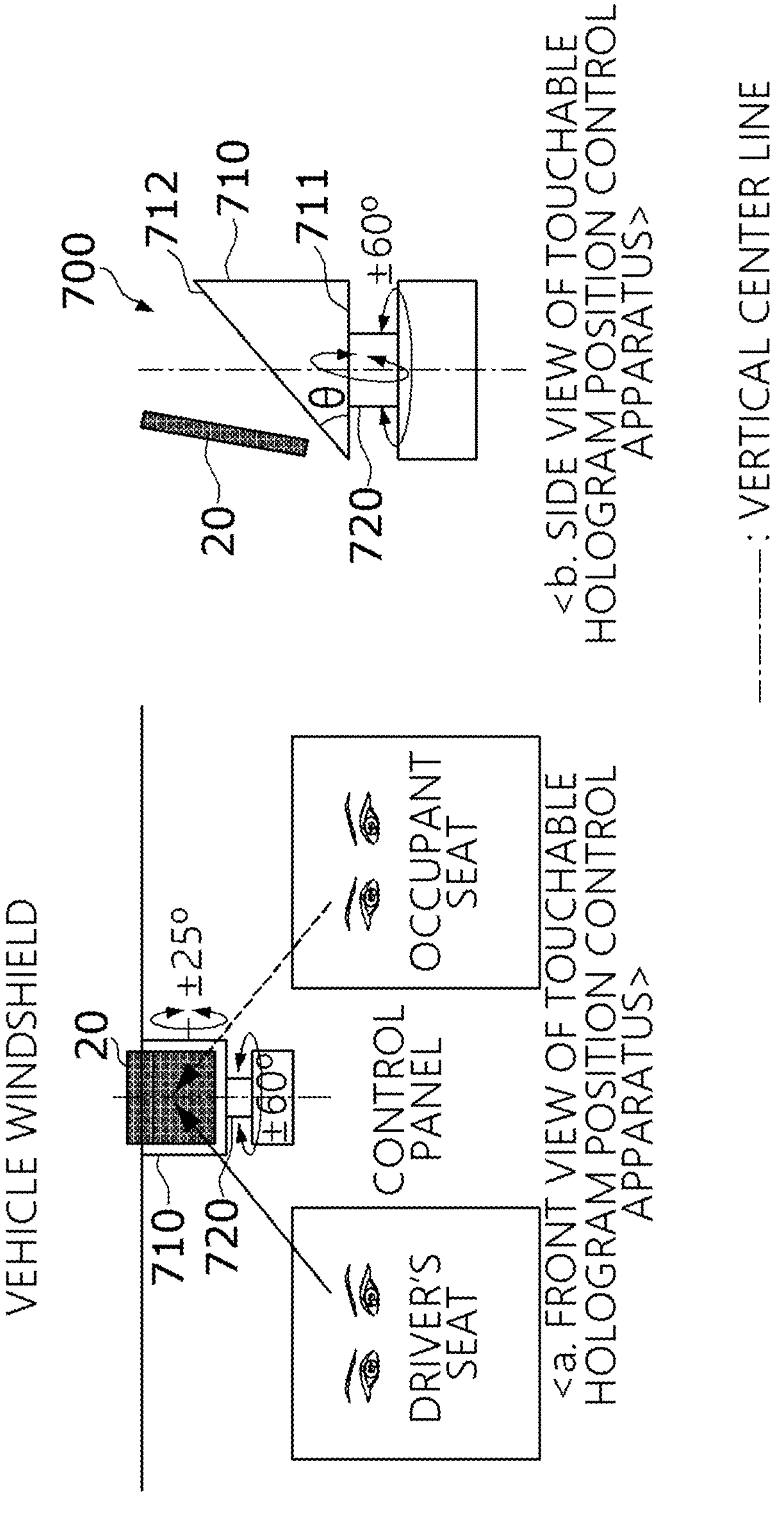
FIG. 7 is a view illustrating a hologram position control apparatus, according to another embodiment of the present disclosure.

FIG. 7 is a view illustrating a hologram position control apparatus 700, according to another embodiment of the present disclosure.

Referring to FIG. 7, the hologram position control apparatus 700 may be disposed in a central portion between front seats (between a driver's seat and a passenger seat) of a vehicle and may project light emitted from a light source 711 through a plate 712 to form a hologram image 20 in air when an occupant sits therein. In addition, when the occupant touches one of a plurality of functions displayed on the hologram image 20, i.e., a command is received from the occupant in a non-contacting manner, the hologram position control apparatus 700 may perform a function corresponding to the input command such as changing (an angle, a height, and/or forward, backward, left, and right movement of) a seat, temperature control of an air conditioner or heater, illumination control, entertainment device operation, and/or navigation operation.

In this case, the hologram position control apparatus 700 may recognize and trace a face of the occupant using a small camera and automatically adjust a horizontal angle or vertical angle of a hologram module 710 (or the hologram module 150 of FIG. 1) using a position adjusting part 720. As an example, the hologram position control apparatus 700 may adjust the horizontal angle of the hologram module 710 to ±60° with respect to 0°, which is a default angle, and the vertical angle to ±25° with respect to 0°. Accordingly, the visibility, appropriability, readability of the hologram image 20 formed in an air through the hologram module 710 may be improved.

In addition, an entire case (that is a housing) of the hologram position control apparatus 700 may be formed as a structure having a certain inclination θ (as an example, ranging 0 to 45 degrees) to meet a height of eyes of an occupant on the front seat. The hologram position control apparatus 700 or the hologram module 710 may be installed on a control panel or front/back seat console of the vehicle.

Hereinafter, a hologram position control method according to one embodiment of the present disclosure is described based on the description provided above.

Figure 8:
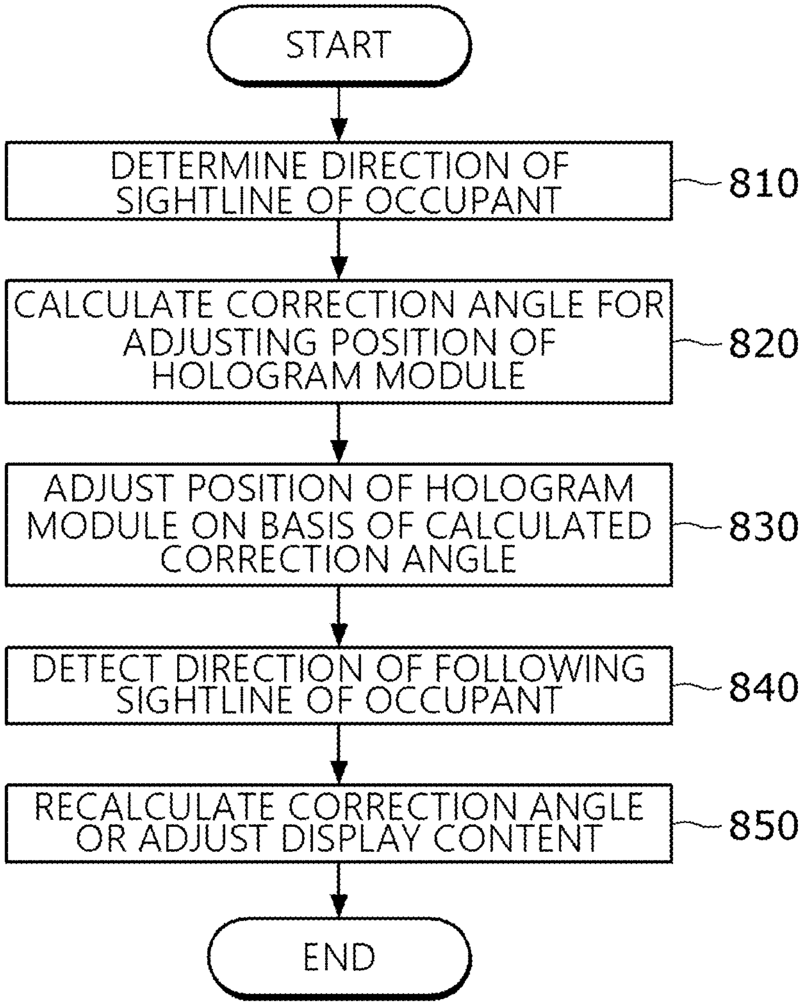
FIG. 8 is a flowchart illustrating a hologram position control method, according to one embodiment of the present disclosure.

FIG. 8 is a flowchart illustrating a hologram position control method, according to one embodiment of the present disclosure.

Referring to FIG. 8, in an operation S810, a hologram position control apparatus 100 may determine a direction of a sightline of a user with respect to a hologram module 150. In the operation S810, the hologram position control apparatus 100 may receive a captured image obtained by capturing an image of a face of an occupant using at least one camera, may analyze the captured image, and may determine a direction of a sightline of the occupant.

In an operation S820, the hologram position control apparatus 100 may calculate a correction angle for adjusting a position of the hologram module 150 based on the direction of the sightline determined in the operation S810. In the operation S820, a horizontal correction angle may be calculated using Equation 1, or a vertical correction angle may be calculated using Equation 2.

In an operation S830, the hologram position control apparatus 100 may adjust the position, i.e., at least one of a horizontal angle and a vertical angle, of the hologram module 150 based on the correction angle calculated in the operation S820. Then, the hologram image 10 is displayed in air according to the corrected horizontal angle and/or vertical angle. When the occupant looking at the hologram image touches an entire or partial region of the hologram image, the hologram position control apparatus 100 or processing apparatus (such as CPU) connected to the touched region may operate a related apparatus based on the corresponding touch (seat movement, temperature control in a vehicle, window opening or closing, and/or entertainment system control).

In addition, when a direction of the following sightline of the occupant toward the hologram image is detected as a result of analyzing the captured image in an operation S840, the hologram position control apparatus 100 may adjust at least one of the horizontal angle and the vertical angle of the hologram module 150 again based on the detected direction of the following sightline, or content of the hologram image in an operation S850. In the operation S850, the hologram position control apparatus 100 may perform the operation S820 again or dynamic control such as emphasizing or changing content of the hologram image and displaying additional information.

As described above, embodiments of the present disclosure may provide optimum hologram visibility to a user at any position of the user and allow the user to conveniently manipulate various functions through a hologram by adjusting a horizontal angle or vertical angle of the hologram module 150 according to a position and a sightline of the user when a hologram image is provided to the user by the hologram display.

According to embodiments of the present disclosure, optimum hologram visibility may be provided at a position of a user who requests a hologram image to be displayed, and thus the user can conveniently manipulate various functions through a hologram by automatically adjusting at least one of a horizontal angle and a vertical angle of a hologram module according to the position and a sightline of the user when the hologram image is provided to the user by the hologram module.

Effects that can be achieved from the present disclosure are not limited to the above-described effects. Other effects that are not described herein should be more clearly understood by those having ordinary skill in the art to which the present disclosure pertains from the description above.

The above-described illustrative methods of the present disclosure are described as a series of operations for clearness of the description but are not to limit the order that the operations are performed. The operations may be performed at the same time or according to different orders as needed. In order to implement the methods according to embodiments of the present disclosure, other operations may be additionally added to the illustrative operations, some operations may be eliminated and the other operations may be included therein, or some operations may be eliminated and other separate operations may be included therein.

The described embodiments of the present disclosure do not list all possible combinations and are intended to describe representative aspects of the present disclosure. Contents described in the various embodiments may be applied independently, or combinations of two or more thereof may be applied.

In addition, the various embodiments of the present disclosure may be implemented using hardware, firmware, software, combinations thereof, and the like. In the case of implementation using hardware, the various embodiments may be implemented using one or more of application specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, or the like.

The scope of the present disclosure includes executable software or machine commands (for example, operating systems, applications, firmware, and programs), that allow the operations according to the methods of the various embodiments to be performed on apparatuses and computers, and non-transitory computer-readable medium in which the software or commands executable on apparatuses or computers are stored.

What is claimed is:

1. A hologram position control apparatus comprising:

a hologram module configured to project a hologram image in an air region;

a position adjusting part configured to adjust a position of the hologram module;

at least one processor; and at least one memory configured to store at least one program executable by the at least one processor, wherein the at least one processor is configured to calculate a correction angle for adjusting the position of the hologram module based on a direction of a sightline of a user, and the position adjusting part is configured to adjust the position of the hologram module by rotating the hologram module in a clockwise or counterclockwise direction based on the calculated correction angle.

2. The hologram position control apparatus of claim 1, wherein:

the at least one processor is configured to calculate at least one of a horizontal correction angle for adjusting a horizontal angle of the hologram module or a vertical correction angle for adjusting a vertical angle of the hologram module based on the direction of the sightline; and the position adjusting part is configured to adjust at least one of the horizontal angle or the vertical angle of the hologram module based on the at least one of the calculated horizontal correction angle or the calculated vertical correction angle.

3. The hologram position control apparatus of claim 2, wherein:

the adjusted horizontal angle is the horizontal correction angle at which the hologram module rotates clockwise or counterclockwise with respect to a vertical center line of the hologram module when directly viewing a front surface of the hologram module; and the adjusted vertical angle is the vertical correction angle at which the hologram module rotates clockwise or counterclockwise with respect to a horizontal center line of the hologram module when directly viewing the front surface of the hologram module.

4. The hologram position control apparatus of claim 2, wherein the at least one processor is configured to calculate the horizontal correction angle based on a distance between the hologram module and an eye of the user.

5. The hologram position control apparatus of claim 4, wherein the at least one processor is configured to calculate the horizontal correction angle according to $$\theta_{h0} = \tan^{-1}\frac{d}{y},$$

wherein $\theta_{h0}$ is the horizontal correction angle, d is a minimum distance between a horizontal center line of the hologram module and the eye of the user, and y is a minimum distance between a vertical center line of the hologram module and the eye of the user.

6. The hologram position control apparatus of claim 2, wherein the at least one processor is configured to calculate the vertical correction angle using an angle formed between a front surface of the hologram module and the hologram image, a position of an eye of the user, and an angle at which the eye of the user sees the hologram module.

7. The hologram position control apparatus of claim 6, wherein the at least one processor is configured to calculate the vertical angle according to $$\theta_{v1} = \tan^{-1}\left(\frac{h}{x}\right), \text{ and}$$

$$\theta_{v2} = \theta_{v0} - \left(\frac{\pi}{2} - \theta_{v1}\right),$$

wherein $\theta_{v1}$ is an angel formed with respect to a horizontal line when the eye of the user sees the hologram module, x is a horizontal distance from a central point of the front surface to the eye of the user, h is a vertical distance from the central point of the front surface to the eye of the user, $\theta_{v2}$ is the vertical correction angle, and $\theta_{v0}$ is an angle formed between the front surface and the hologram image.

8. The hologram position control apparatus of claim 1, wherein the at least one processor is configured to control the hologram module to dynamically adjust content displayed on the hologram image according to the direction of the sightline of the user.

9. The hologram position control apparatus of claim 8, wherein the hologram module is configured to perform at least one of emphasizing the content, changing the content, or displaying additional information, that are displayed on the hologram image.

10. The hologram position control apparatus of claim 1, further comprising at least one camera configured to transmit a captured image including a face of the user, wherein the at least one processor is configured to analyze the captured image and detect the direction of the sightline of the user.

11. A hologram position control method, performed by a computing apparatus including at least one processor and a memory storing at least one program executable by the at least one processor, the hologram position control method comprising:

determining a direction of a sightline of a user with respect to a hologram module;

calculating a correction angle for adjusting a position of the hologram module based on the determined direction of the sightline; and adjusting the position of the hologram module by rotating the hologram module in a clockwise or counterclockwise direction based on the calculated correction angle.

12. The hologram position control method of claim 11, wherein:

calculating the correction angle includes calculating at least one of a horizontal correction angle for adjusting a horizontal angle of the hologram module or a vertical correction angle for adjusting a vertical angle of the hologram module based on the direction of the sightline; and adjusting of the position includes adjusting at least one of the horizontal angle or the vertical angle of the hologram module based on the at least one of the calculated horizontal correction angle or the calculated vertical correction angle.

13. The hologram position control method of claim 12, wherein:

the adjusted horizontal angle is the horizontal correction angle at which the hologram module rotates clockwise or counterclockwise with respect to a vertical center line of the hologram module when directly viewing a front surface of the hologram module; and the adjusted vertical angle is the vertical correction angle at which the hologram module rotates clockwise or counterclockwise with respect to a horizontal center line of the hologram module when directly viewing the front surface of the hologram module.

14. The hologram position control method of claim 12, wherein calculating the correction angle includes calculating the horizontal correction angle based on a distance between the hologram module and an eye of the user.

15. The hologram position control method of claim 14, wherein calculating the correction angle includes calculating the horizontal correction angle according to $$\theta_{h0} = \tan^{-1}\frac{d}{y},$$

wherein $\theta_{h0}$ is the horizontal correction angle, d is a minimum distance between a horizontal center line of the hologram module and the eye of the user, and y is a minimum distance between a vertical center line of the hologram module and the eye of the user.

16. The hologram position control method of claim 12, wherein calculating the correction angle includes calculating the vertical correction angle using an angle formed between a front surface of the hologram module and a hologram image, a position of an eye of the user, and an angle at which the eye of the user sees the hologram module.

17. The hologram position control method of claim 16, wherein calculating the correction angle includes calculating the vertical angle according to $$\theta_{v1} = \tan^{-1}\left(\frac{h}{x}\right), \text{ and}$$

$$\theta_{v2} = \theta_{v0} - \left(\frac{\pi}{2} - \theta_{v1}\right),$$

wherein $\theta_{v1}$ is an angel formed with respect to a horizontal line when the eye of the user sees the hologram module, x is a horizontal distance from a central point of the front surface to the eye of the user, h is a vertical distance from the central point of the front surface to the eye of the user, $\theta_{v2}$ is the vertical correction angle, and $\theta_{v0}$ is an angle formed between the front surface and the hologram image.

18. The hologram position control method of claim 11, further comprising dynamically adjusting content displayed on a hologram image according to the direction of the sightline of the user.

19. The hologram position control method of claim 18, wherein the hologram module performs at least one of emphasizing the content, changing the content, and displaying additional information, which are displayed on the hologram image.

20. The hologram position control method of claim 11, wherein determining the direction of the sightline of the user includes detecting the direction of the sightline of the user by analyzing a captured image including a face of the user.

* * * * *